(12) United States Patent
Chang

(10) Patent No.: US 7,458,550 B2
(45) Date of Patent: Dec. 2, 2008

(54) DETACHABLE MOUNTING ASSEMBLY

(76) Inventor: Kuo-Feng Chang, No. 13, Wugong 5th Rd., Sinjhuang City, Taipei County 242 (TW)

( * ) Notice: Subject to any disclaimer, the term of this patent is extended or adjusted under 35 U.S.C. 154(b) by 117 days.

(21) Appl. No.: 11/724,133

(22) Filed: Mar. 14, 2007

(65) Prior Publication Data
US 2008/0042031 A1    Feb. 21, 2008

(30) Foreign Application Priority Data
Aug. 16, 2006  (TW)  ............................ 95214448 U

(51) Int. Cl.
*F21V 21/08* (2006.01)
(52) U.S. Cl. ............... 248/309.1; 403/322.4; 248/917
(58) Field of Classification Search ............ 403/322.4; 248/221.21, 309.1, 917
See application file for complete search history.

(56) References Cited

U.S. PATENT DOCUMENTS

| | | | | |
|---|---|---|---|---|
| 4,290,633 A * | 9/1981 | Sullivan | ...................... | 292/114 |
| 4,930,694 A * | 6/1990 | Yoshitake et al. | ........... | 224/547 |
| 7,175,152 B2 * | 2/2007 | Dittmer | ................. | 248/221.11 |
| 7,317,613 B2 * | 1/2008 | Quijano et al. | .............. | 361/686 |
| 2006/0076463 A1 * | 4/2006 | Drew | .......................... | 248/121 |
| 2006/0231667 A1 * | 10/2006 | Tsuo | ....................... | 242/384.5 |
| 2007/0205340 A1 * | 9/2007 | Jung | ....................... | 248/125.9 |
| 2007/0217134 A1 * | 9/2007 | Shin | ............................. | 361/681 |

\* cited by examiner

*Primary Examiner*—Robert J Sandy
*Assistant Examiner*—Joshua T Kennedy
(74) *Attorney, Agent, or Firm*—Ming Chow; Sinorica, LLC

(57) ABSTRACT

A detachable mounting assembly is disclosed to include a mounting unit formed of a mounting plate for supporting an external member and a coupling plate coupled to the mounting plate, the mounting plate having a hook rod extended through the coupling plate, the coupling plate having L-shaped top hooks and a bottom stop flange, and a locking unit formed of a connecting plate hung on the top hooks of the coupling plate and a spring-supported locking bar pivoted to the connecting plate and hooked by the hook rod of the mounting plate and biasable relative to the connecting plate between the locking position where a backward locking tongue of the locking bar is hooked on a bottom stop flange of the coupling plate and a flat bottom lug of the connecting plate to lock the connecting plate to the coupling plate and the unlocking position where the locking tongue is suspending in one opening at one side of the bottom stop to release the connecting plate from the coupling plate for allowing removal of the connecting plate from the coupling plate.

8 Claims, 5 Drawing Sheets

DETACHABLE MOUNTING ASSEMBLY

BACKGROUND OF THE INVENTION

1. Field of the Invention

The present invention relates generally to a mounting assembly for securing two members together, for example, for securing a flat-panel display to a stand, and more particularly, to a detachable mounting assembly that is quickly detachable.

2. Description of the Related Art

Flat-panel display devices such as LCD monitor, LCD TV, plasma TV, etc., have been intensively used to substitute for conventional CRT display devices for the advantages of light and thin characteristics. A standing flat-panel display device or desk-top flat-panel display device generally comprises a stand, a display panel, and a mounting assembly joining the display panel and the stand and allowing adjustment of angle of elevation of the, display panel relative to the stand.

Nowadays, flat-panel display devices are made greater than ever, resulting in a heavy weight. When a big-size flat-panel display device is used, it may be directly hung on the wall by means of a bracket. For allowing connection of a big-size flat-panel display device to a bracket, the big-size flat-panel display device is processed to provide four mounting screw holes on the back side in the four corners. Connecting plates are then used with screws to affix the mounting screw holes of the big-size flat-panel display device to the bracket or a suspension arm. Because the connecting plates are affixed to the bracket or suspension arm for the mounting of the big-size flat-panel display device, the installation of the big-size flat-panel display device is subject to the locations of the connecting plates.

Because the big-size flat-panel display device is the main body when compared to the bracket or suspension arm, it is not a good way to accommodate the big-size flat-panel display device to the parts of the bracket or suspension arm when mounting the big-size flat-panel display device. Mounting the big-size flat-panel display device in this manner will risk the damage to the big-size flat-panel display device. Further, this mounting procedure is complicated. When wishing to remove the big-size flat-panel display device from the bracket or suspension arm, the dismounting procedure is also complicated.

Therefore, it is desirable to provide a detachable mounting assembly that eliminates the aforesaid drawbacks.

SUMMARY OF THE INVENTION

The present invention has been accomplished under the circumstances in view. According to one aspect of the present invention, the detachable mounting assembly comprises a mounting unit and a locking unit. The mounting unit comprises a mounting plate for supporting an external member and a coupling plate coupled to the mounting plate. The mounting plate has a plurality of mounting through holes on diagonal corners for fastening to an external member to be supported, and a hook rod perpendicularly extended from a back side and inserted through the coupling plate. The coupling plate has at least one hook protruded from the top side, a stop flange downwardly extending from the bottom side, and an opening at each of the two opposite sides of the stop flange. The locking unit comprises a connecting plate, the connecting plate having at least one hook hole disposed near the top side and respectively coupled to the at least one hook of the coupling plate of the mounting unit, a flat bottom lug downwardly extending from the bottom side, and a pivot hole near the top side of the flat bottom lug, a locking bar pivoted to the connecting plate, the locking bar having a vertically extending oblong slot on the top end and a bottom end suspending below the elevation of the flat bottom lug and a locking tongue perpendicularly extended from the back side, a pivot bolt inserted through the oblong slot of the locking bar and the pivot hole of the connection plate to pivotally secure the locking bar to the connecting plate, and a torsional spring supported on said pivot bolt. The hook rod of the mounting plate is inserted through the through hole of the connection plate and hooked on the locking bar, and the locking tongue hooks up the sector-like stop flange and the flat bottom lug, thereby locking the connection plate of the locking unit to the coupling plate of the mounting unit.

According to another aspect of the present invention, the coupling plate is pivotally connected to the mounting plate with a pivot, having a smoothly arched slot; the mounting plate has a stop rod backwardly extending from a backside thereof and inserted through the smoothly arched slot to guide movement of the coupling plate relative to the mounting plate and to limit the angle of rotation of the coupling plate relative to the mounting plate.

According to still another aspect of the present invention, the locking unit further comprises a lubrication pad mounted on the pivot bolt between the flat bottom lug and the locking bar, having a plurality of oil holes for accommodating a lubrication oil.

According to still another aspect of the present invention, the connection plate has two support arms bilaterally backwardly extended from two opposite lateral sides thereof and respectively pivotally connected to two opposite sidewalls of a bracket with a respective pivot.

BRIEF DESCRIPTION OF THE DRAWINGS

FIG. 4 is a sectional view taken along line B-B of FIG. 3a.

DETAILED DESCRIPTION OF THE INVENTION

Figure 1:
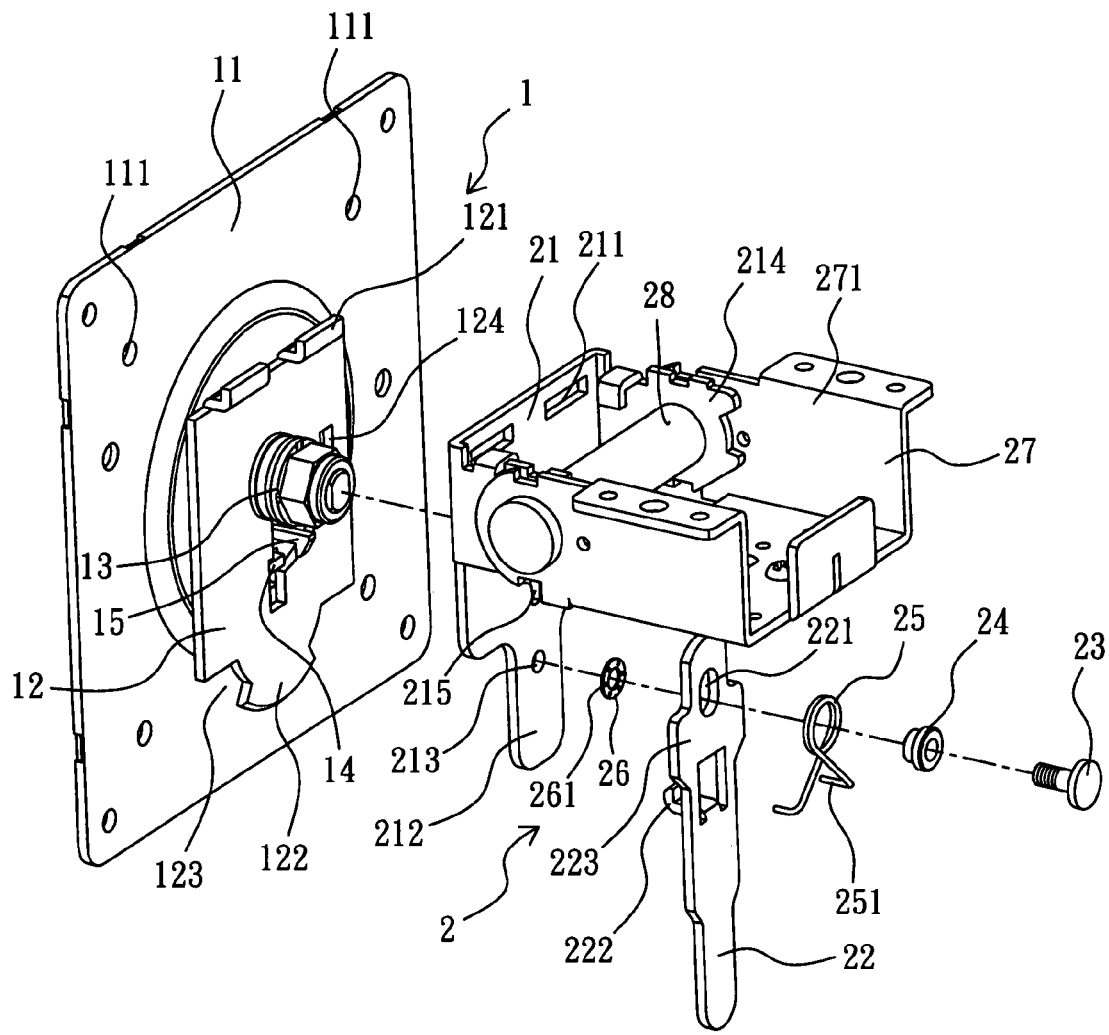
FIG. 1 is an exploded view of a detachable mounting assembly according to the present invention.

Referring to FIG. 1, a detachable mounting assembly in accordance with the present invention is shown comprised of a mounting unit 1 and a locking unit 2.

The mounting unit 1 comprises a mounting plate 11, and a coupling plate 12 pivoted to the mounting plate 11. The mounting plate 11 is a rectangular plate having a plurality of mounting through holes 111 cut through the front and back sides at locations corresponding to the oblique lines extending from the center to the four corners of the mounting plate for the mounting of fastening members, for example, screws to affix the mounting plate 11 to the back side of the load, for example, flat-panel display (not shown). The coupling plate 12 is pivotally connected to the center of the back side of the mounting plate 11 with a pivot 13, having two hooks 121 bilaterally disposed at the top side, a sector-like stop flange 122 downwardly extending from the bottom side, and two openings 123 on the bottom edge at two sides of the sector-like stop flange 122. The hooks 121 are formed of a part of the coupling plate 12 by stamping, each having a substantially L-shaped cross section, i.e., the hooks 121 extend backwardly from the coupling plate 12 in horizontal and then turned vertically upwards. By means of the pivot 13, the mounting plate 11 and the coupling plate 12 are biasable relative to each other.

In order to limit the angle of rotation of the mounting plate 11 relative to the coupling plate 12, the coupling plate 12 has a smoothly arched sliding slot 124 cut through the front and back sides around the pivot 13, and the mounting plate 11 has a stop rod 14 perpendicularly extended from the back side and inserted through the smoothly arched sliding slot 124. Further, a hook rod 15 (which has a beveled face facing downwards) extends perpendicularly backwardly from the mounting plate 11.

The locking unit 2 comprises a connecting plate 21 and a locking bar 22. The connecting plate 21 has two hook holes 211 respectively coupled to the hooks 121 of the coupling plate 12 of the mounting unit 1. After connection of the hook holes 211 of the connection plate 21 to the hooks 121 of the coupling plate 12 of the mounting unit 1, the connection plate 21 is secured to the coupling plate 12 of the mounting unit 1 steadily. The connection plate 21 has a flat bottom lug 212, and a pivot hole 213 near the top end of the flat bottom lug 212, and a through hole 215 for the passing of the hook rod 15 of the mounting plate 11.

The locking bar 22 has an oblong slot 221 on its one end, a locking tongue 222 perpendicularly extended from its back side on the middle, and two wings 223 at two sides between the oblong slot 221 and the locking tongue 222. A pivot bolt 23 is fastened to the oblong slot 221 of the locking bar 22 and the pivot hole 213 of the connection plate 21 to pivotally secure the locking bar 22 to the connecting plate 21. A stepped cushion 24 is mounted on the pivot bolt 23 and stopped between the head of the pivot bolt 23 and the connecting plate 21. A torsional spring 25 is supported on the stepped cushion 24 around the pivot bolt 23, having two hooked ends 251 respectively hooked on two opposite lateral sides of the locking bar 22.

Figure 2:
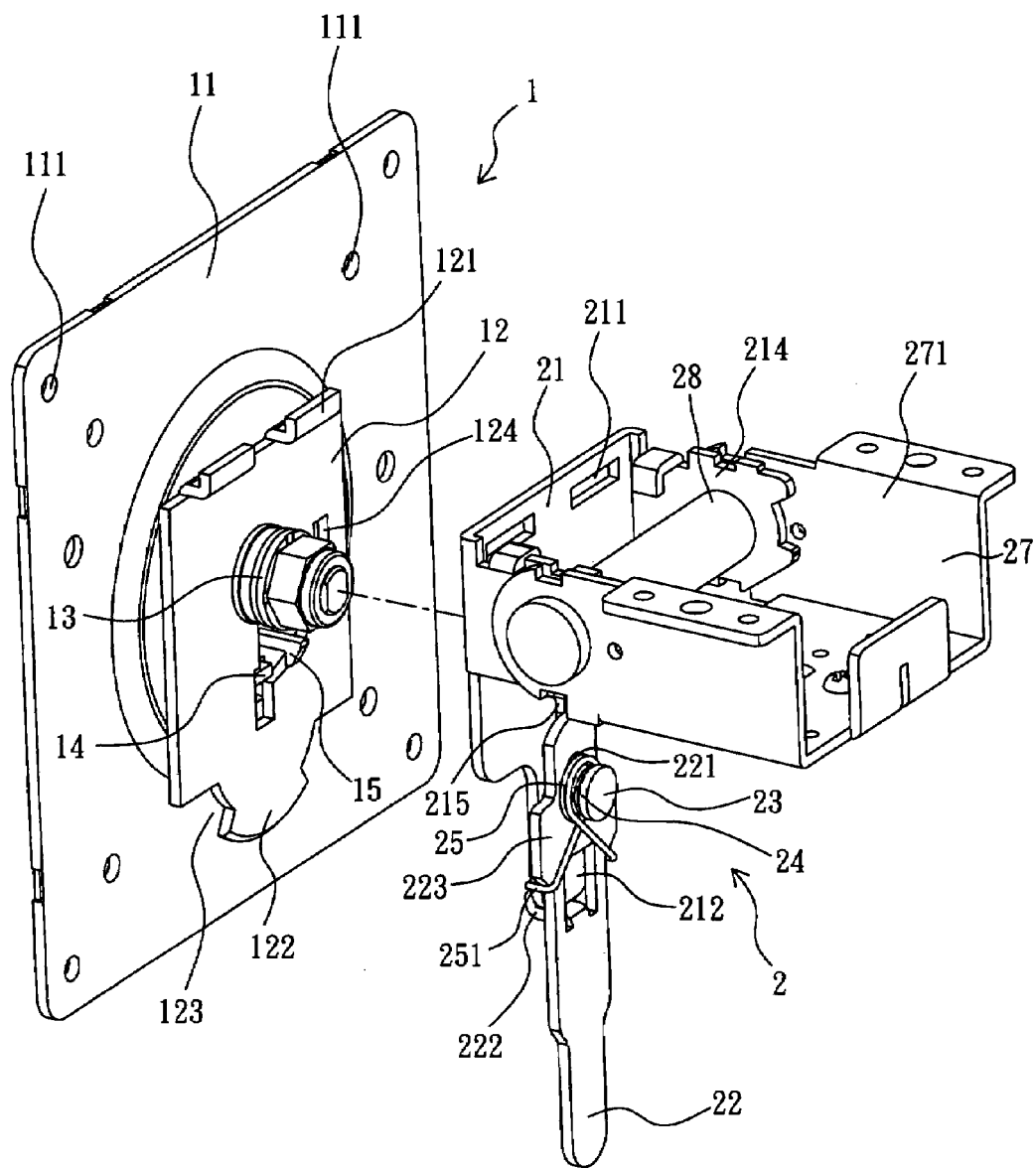
FIG. 2 is an elevational assembly view of the detachable mounting assembly according to the present invention.

As illustrated, a lubrication pad 26 is mounted on the pivot bolt 23 and stopped between the flat bottom lug 212 and the locking bar 22, having a plurality of oil holes 261 for accommodating a lubrication oil to lubricate the related parts. The connection plate 21 has two support arms 214 bilaterally backwardly extended from the two opposite lateral sides thereof and respectively pivotally connected to two opposite sidewalls 271 of a bracket 27 with a respective pivot 28. Thus, the connecting plate 21 can be turned relative to the bracket 27 to adjust its angle of elevation, as shown in FIG. 2.

Figure 3A:
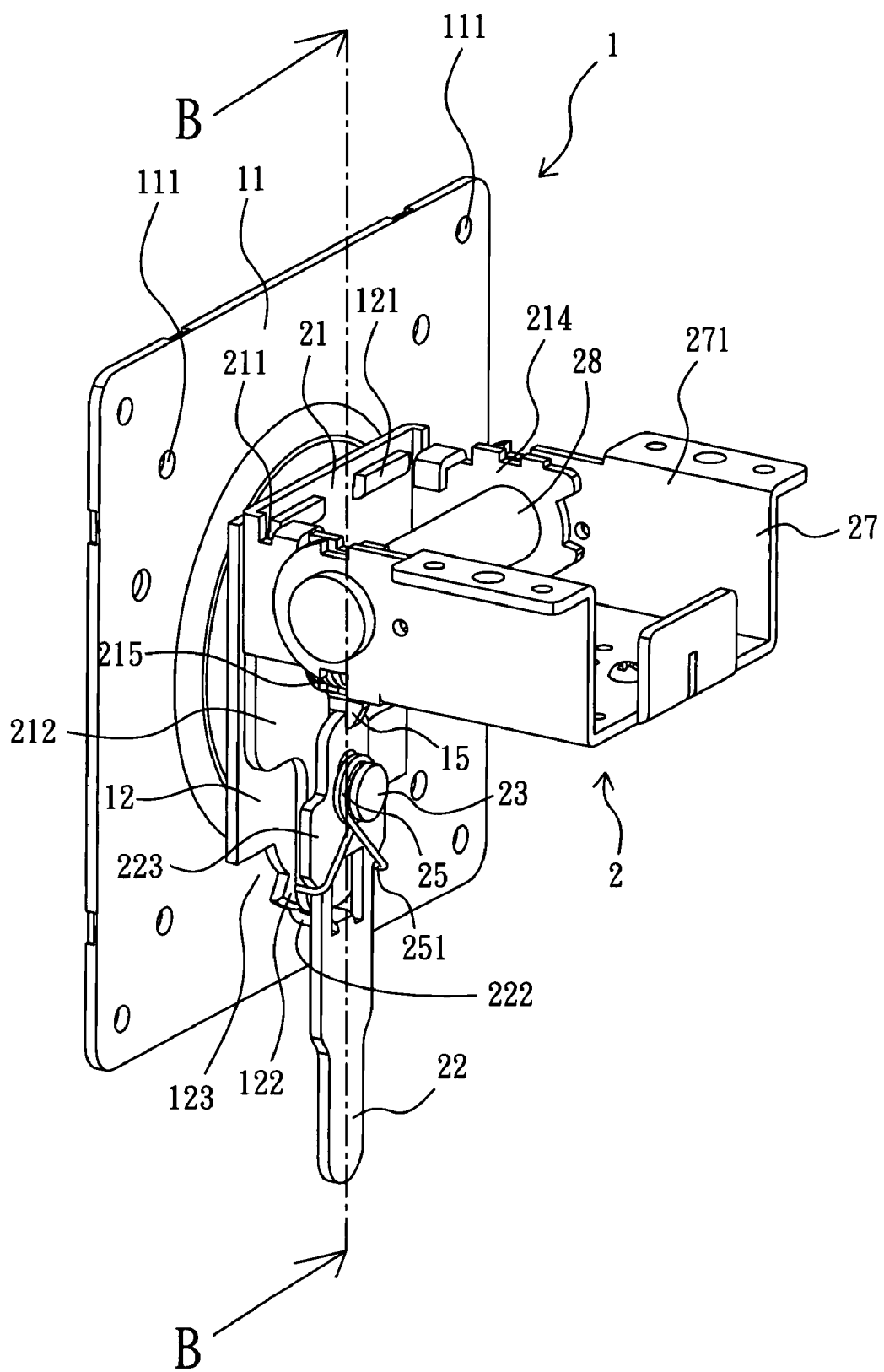
FIG. 3a is an elevational view of the present invention, showing the locking unit of the detachable mounting assembly locked.
Figure 4:
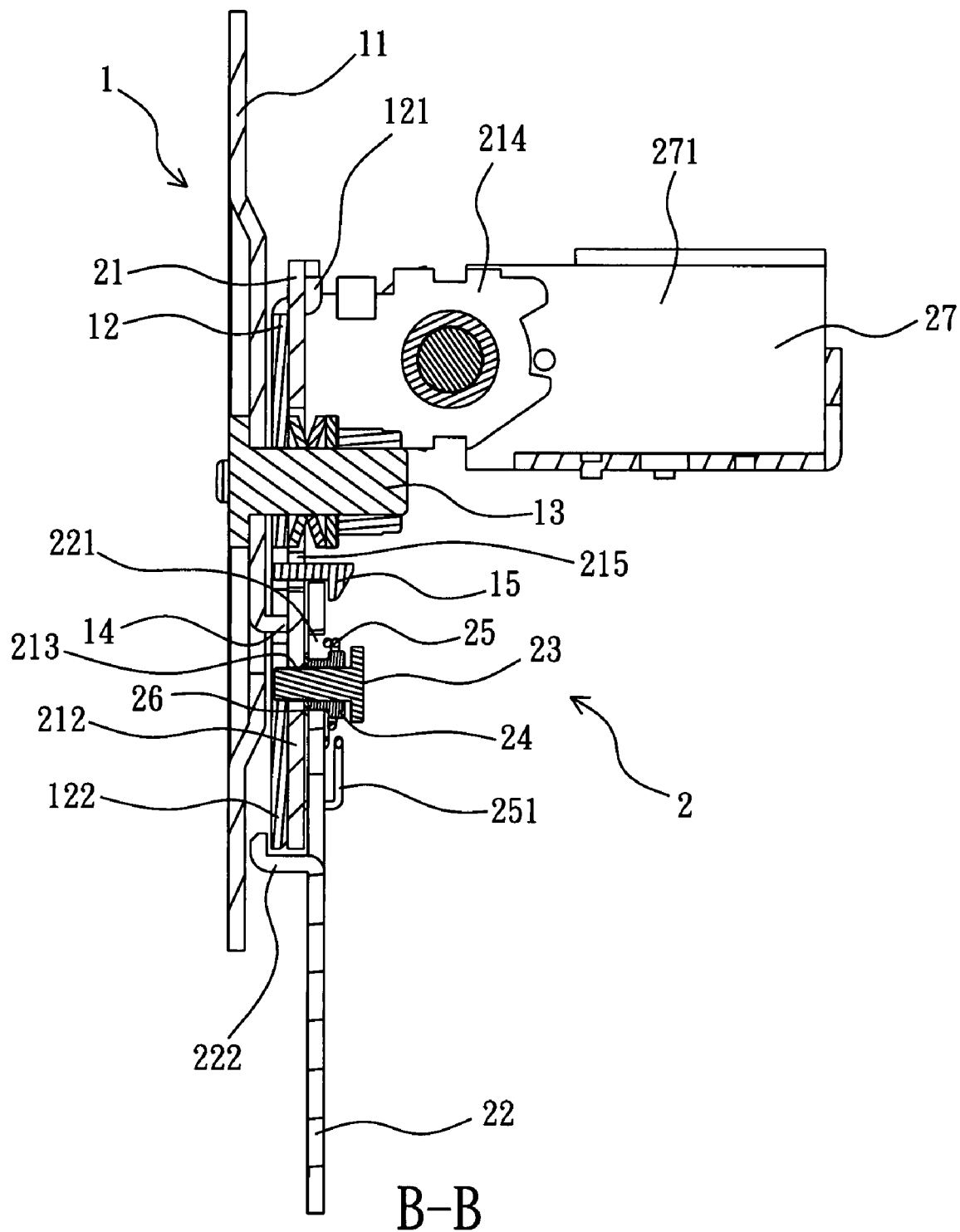

When fastening the hook holes 211 of the connection plate 21 to the hooks 121 of the coupling plate 12 of the mounting unit 1, the hook rod 15 of the mounting plate 11 is inserted through the through hole 215 of the connection plate 21, and the top edge of the locking bar 22 is stopped at the beveled face of the hook rod 15. Because the slot 221 of the locking bar 22 is an oblong slot and the cushion 24 is a stepped member partially inserted into the oblong slot 221, the locking bar 22 is moving downwards along the beveled face of the hook rod 15 and the locking tongue 222 is moved with the locking bar 22 downwards along the flat bottom lug 212 to the position where the top edge of the locking bar 22 is forced into the inside of the hook rod 15 and the locking tongue 222 hooks up the sector-like stop flange 122 and the flat bottom lug 212, and at the same time the two hooked ends 251 of the torsional spring 25 are stopped at the bottom edges of the wings 223, i.e., the connection plate 21 of the locking unit 2 is locked to the coupling plate 12 of the mounting unit 1 as shown in FIGS. 3a and 4.

Figure 3B:
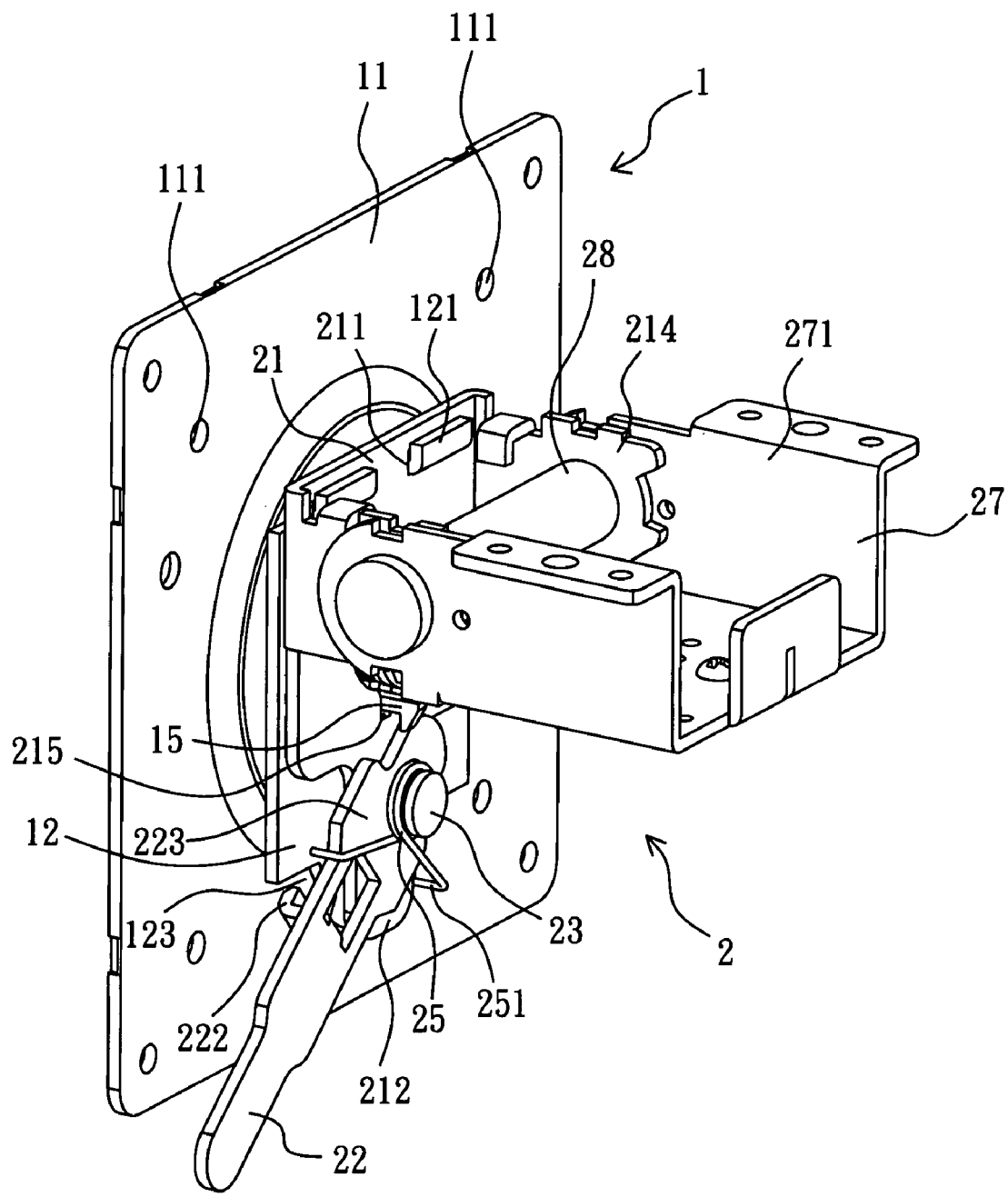
FIG. 3b is similar to FIG. 3a but showing the locking unit of the detachable mounting assembly unlocked.

When to unlock the detachable mounting assembly, turn the locking bar 22 sideways either toward the left side or the right side to disengage the top edge of the locking bar 22 from the hook rod 15 and simultaneously to move the locking tongue 222 away from the sector-like stop flange 122 and the flat bottom lug 212 and to have the locking tongue 22 be stopped at the bottom edge of the coupling plate 12 and received in one opening 123 (see FIG. 3b). Thereafter, the mounting unit 1 is separated from the locking unit 2.

A prototype of detachable mounting assembly has been constructed with the features of FIGS. 1~4. The detachable mounting assembly functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A detachable mounting assembly comprising:

a mounting unit, said mounting unit comprising a mounting plate for supporting an external member and a coupling plate coupled to said mounting plate, said mounting plate having a plurality of mounting through holes on diagonal corners thereof for fastening to an external member to be supported thereon and a hook rod perpendicularly extended from a back side thereof and inserted through said coupling plate, said coupling plate having at least one hook protruded from a sector-shaped top side thereof, a stop flange downwardly extending from a bottom side thereof, and at least one opening at one of two opposite sides of said sector-shaped stop flange; and a locking unit, said locking unit comprising a connecting plate, said connecting plate having at least one hook hole disposed near a top side thereof and respectively coupled to the at least one hook of said coupling plate of said mounting unit, a flat bottom lug downwardly extending from a bottom side thereof; and a pivot hole near a top side of said flat bottom lug, a locking bar pivoted to said connecting plate, said locking bar having a vertically extending oblong slot on a top end thereof and a bottom end suspending below the elevation of said flat bottom lug and a locking tongue perpendicularly extended from a back side thereof, a pivot bolt inserted through the oblong slot of said locking bar and the pivot hole of said connection plate to pivotally secure said locking bar to said connecting plate, and a torsional spring supported on said pivot bolt; and wherein said hook rod of said mounting plate is inserted through the through hole of the connection plate and biases the locking bar downwardly to a point where said locking tongue extends below said stop flange and is the hooked up said flange and said flat bottom lug when the top edge of the locking bar is forced inside of the hook rod, thereby locking said connection plate of said locking unit to said coupling plate of said mounting unit.

2. The detachable mounting assembly as claimed in claim 1, wherein said coupling plate is pivotally connected to said mounting plate with a pivot.

3. The detachable mounting assembly as claimed in claim 1, wherein said at least one hook of said coupling plate each is a L-shaped hook backwardly extended from said coupling plate in horizontal and then turned vertically upwards.

4. The detachable mounting assembly as claimed in claim 1, wherein said stop flange of said coupling plate is a sector-shaped flat member.

5. The detachable mounting assembly as claimed in claim 1, wherein said coupling plate is pivotally connected to said mounting plate with a pivot, having a smoothly arched slot; said mounting plate has a stop rod backwardly extending from a backside thereof and inserted through said smoothly arched slot to guide movement of said coupling plate relative to said mounting plate and to limit the angle of rotation of said coupling plate relative to said mounting plate.

6. The detachable mounting assembly as claimed in claim 1, wherein said locking unit further comprises a stepped cushion mounted on said pivot bolt and stopped between a head of said pivot bolt and said torsional spring; said locking bar has two wings at two opposite lateral sides; said torsional spring is mounted on said stepped cushion around said pivot bolt, having two hooked ends respectively hooked on two opposite lateral sides of said locking bar and respectively stopped at a bottom edge of each of the two wings of said locking bar.

7. The detachable mounting assembly as claimed in claim 1, wherein said locking unit further comprises a lubrication pad mounted on the pivot bolt between said flat bottom lug and said locking bar, said lubrication pad having a plurality of oil holes for accommodating a lubrication oil.

8. The detachable mounting assembly as claimed in claim 1, wherein said connection plate has two support arms bilaterally backwardly extended from two opposite lateral sides thereof and respectively pivotally connected to two opposite sidewalls of a bracket with a respective pivot.

* * * * *

UNITED STATES PATENT AND TRADEMARK OFFICE
CERTIFICATE OF CORRECTION

PATENT NO. : 7,458,550 B2  Page 1 of 1
APPLICATION NO. : 11/724133
DATED : October 2, 2008
INVENTOR(S) : Kuo-Feng Chang It is certified that error appears in the above-identified patent and that said Letters Patent is hereby corrected as shown below:

On the Title Page, the Assignee should read -- Assignee: JARLLYTEC CO., LTD, Taipei County (TW) --

Signed and Sealed this

Twenty-third Day of March, 2010

David J. Kappos
*Director of the United States Patent and Trademark Office*